United States Patent [19]

Schlapp et al.

[11] Patent Number: 4,720,138
[45] Date of Patent: Jan. 19, 1988

[54] SLIDING ROOF FOR AUTOMOBILES

[75] Inventors: Albert Schlapp, Dreieich; Horst Böhm, Frankfurt am Main; Rainer Grimm, Wetzlar, all of Fed. Rep. of Germany

[73] Assignee: Rockwell-Golde G.m.b.H., Fed. Rep. of Germany

[21] Appl. No.: 905,002

[22] Filed: Sep. 8, 1986

[30] Foreign Application Priority Data

Oct. 2, 1985 [DE] Fed. Rep. of Germany ....... 3535126

[51] Int. Cl.⁴ .......................... B60J 7/053; B60J 7/195
[52] U.S. Cl. .................................... 296/222; 296/224; 49/488; 49/493
[58] Field of Search ....................... 296/216, 224, 222; 49/488, 493

[56] References Cited

U.S. PATENT DOCUMENTS

| | | | |
|---|---|---|---|
| 4,043,239 | 8/1977 | DeFusco | 296/187 X |
| 4,323,277 | 4/1982 | Rengstl et al. | 296/216 |

FOREIGN PATENT DOCUMENTS

| | | | |
|---|---|---|---|
| 1182082 | 11/1964 | Fed. Rep. of Germany . | |
| 1260999 | 2/1968 | Fed. Rep. of Germany | 296/222 |
| 1942576 | 3/1971 | Fed. Rep. of Germany | 296/222 |
| 2313453 | 9/1974 | Fed. Rep. of Germany | 296/222 |
| 1555555 | 10/1977 | Fed. Rep. of Germany . | |
| 2844515 | 4/1979 | Fed. Rep. of Germany | 296/224 |
| 3100757 | 12/1981 | Fed. Rep. of Germany . | |
| 3046399 | 7/1982 | Fed. Rep. of Germany | 296/222 |
| 3221487 | 12/1983 | Fed. Rep. of Germany . | |
| 172819 | 10/1982 | Japan | 296/222 |
| 1104320 | 2/1968 | United Kingdom | 296/222 |
| 2033850 | 5/1980 | United Kingdom | 296/222 |

Primary Examiner—D. H. Pedder

[57] ABSTRACT

In a sliding roof for automobiles, a sliding lid is secured against tearing out from the roof opening due to the high uplift forces acting on it at extremely high speeds of travel of the order of 300 km/h (186 m.p.h.), by a sealing profile strip, engaging beneath an edge flange of an automobile roof and secured against stripping off from the sliding lid by means of a holding frame. The sealing strip has two grooves, one engaging a downwardly-extending peripheral flange of the lid and the other engaging holding elements which extend substantially horizontally, spaced from, beneath and beyond the downwardly-extending flange. In addition, support levers can be mounted height-adjustably on the holding frame at the front on either side, which levers also engage beneath the fixed automobile roof and bear, with their outer ends, on guide tracks fixed to the automobile roof, which extend along the entire sliding travel of the sliding lid and are fitted at an appropriate slope to follow the movement direction of the lid.

8 Claims, 12 Drawing Figures

SLIDING ROOF FOR AUTOMOBILES

FIELD OF THE INVENTION

This invention relates to a sliding roof for automobiles.

With increasing speed of travel, uplift forces acting upon the closed sliding lid of sliding roof constructions increase, and in many sliding roofs must be resisted exclusively by sliding elements engaging in the guide rails. If extremely fast automobiles are equipped with sliding roof constructions of this type, there is a risk at high speed with the sliding roof closed that the uplift forces will tear the sliding lid out of the roof opening.

DESCRIPTION OF THE PRIOR ART

A sliding roof is known from DE-PS 32 21 487, in which hook-like projections are disposed on the sliding elements, which projections engage around a guide flange of the associated guide rail, thus providing additional security against lifting of the sliding elements off the guide rails. In spite of these additional safety devices, at extremely high speeds of travel, i.e. speeds up to the order of 300 km/h (186 m.p.h.), a risk still exists, due to the high uplift forces acting on the sliding lid, that the guide rails may be torn from their anchorage, or that the hook-like projections on the sliding elements may break off.

Known forms of sliding profile strip provided for the edge gap around the lid are also not suitable for reliably fixing the closed sliding lid in its position at very high speeds of travel. In the form of sealing profile strip disclosed in DE-OS 31 00 757, the sealing profile strip is pushed onto a downwardly orientated edge flange of the sliding lid and does indeed possess a downwardly projecting sealing lip, which engages all around beneath the fixed roof surface and can be pressed from below on to its sealing surface. This sealing lip, however, does not solve the problem of securing the sliding lid at high speeds, because the uplift forces acting on the sliding lid tend to strip the seal off the downwardly orientated edge flange of the sliding lid in reaction to the bearing forces against the lower face of the fixed roof surface.

DE-PS 11 82 082 discloses a case where an edge gap sealing profile strip is pushed into a side groove formed by an upper, horizontal edge of the sliding lid and a support plate is fitted below it on a lid reinforcing frame. In this case also, lifting off of the sliding lid at high speed cannot be prevented because the sealing strip bears solely against upright surfaces of the roof opening, so that only slight frictional forces act against the tendency to lift.

A further known rigid sliding lid is disclosed in DE-PS 15 55 555, in which an edge gap sealing profile strip is pushed onto a downwardly orientated edge flange of the sliding lid. The sealing strip is secured, in the region of the rear edge of the lid, against stripping off if the rear edge is raised with the lid closed by a clamping bar screwed from below onto a lid reinforcing frame, the clamping bar also forming a channel profile for water disposal. This securing is, however, effective only in the rear region of the lid, and therefore cannot prevent lifting-off of the sliding lid in the forward and the two side regions at high speeds of travel.

OBJECT OF THE INVENTION

Accordingly, it is an object of the present invention to provide a sliding roof having a closed sliding lid which is reliably secured against the risk of tearing out from the roof opening, even at high vehicle speeds and the associated very high uplift forces acting on the lid, especially where its area is large. Further, it is intended that the securing against lifting-off of the lid shall be effective during the entire opening movement of the sliding lid.

SUMMARY OF THE INVENTION

According to one aspect of the present invention, there is provided a sliding roof for an automobile, the roof comprising a rigid sliding lid capable of reaching a closed position in which it closes a roof opening leaving a gap around the lid, which lid includes a peripheral, downwardly orientated edge flange, a sealing profile strip on said downwardly orientated edge flange for sealing the peripheral gap, said roof further comprising a sliding roof frame, guide rails mounted laterally on said sliding roof frame, front and rear sliding elements mounted on said guide rails for guiding said sliding lid, said sliding lid having a rear edge which can be lowered by pivoting of said front sliding elements, said sliding lid being then slidable beneath the rear, fixed automobile roof; a mounting frame surrounding the roof opening and secured to the fixed automobile roof, the sliding roof frame being releasably attached at the front and sides to said mounting frame, holding elements for the sealing strip being fitted to the sliding lid from beneath on all four outer edges, said holding elements having horizontal edges which project beyond the periphery of the sliding lid, said holding elements having a width which is uniform and being at a constant vertical spacing from said downwardly orientated edge flange of the sliding lid, said sealing strip having a fixing component which fills said spacing, and sealing strip having a first groove which is pushed onto said horizontal edges, a second groove which is pushed onto said downwardly orientated edge flange of the sliding lid, and a sealing lip which engages an underneath edge of the roof opening.

According to another aspect of the present invention, there is provided a sliding roof for an automobile, the roof including a sliding lid, a sealing strip around its periphery to seal a gap between the lip and a roof opening when the lid is in its closed position, the periphery of the lid having a downwardly-extending flange therearound and sealing strip holding elements extending substantially horizontally, spaced from, beneath and beyond said downwardly-extending flange; and said sealing strip having a first groove by which it engages said holding elements, a second groove by which it engages said flange, and a sealing lip to engage the underneath edge of the roof opening of the automobile, there being a spacing between said flange and said holding elements which is filled by said sealing strip.

The holding elements may consist of four individual parts, which are connected separately to the lid. Preferably, however, provision is made for the holding elements to be combined into a one-piece holding frame with a peripheral horizontal edge, and for the sealing strip pushed onto the edge to receive, with its second groove, the edge flange of the sliding lid, thereby centering the holding frame relative to the sliding lid, the holding frame being secured to the sliding lid by releasable fixing elements. This form of embodiment is particularly simple to manufacture and assemble, because the sealing strip needs to be pushed onto the single-piece holding frame solely from outside onto the peripheral horizontal edge of same, before the latter is fitted to the sliding lid or to the reinforcing frame of this lid. The second groove in the sealing strip and the vertical edge flange of the sliding lid served for centering these components, thereby rendering special measures for aligning the holding frame with respect to the sliding lid superfluous.

In a further embodiment, provision can be made that a support lever is fixed on each side of the lid to the forward holding element or holding frame in height-adjustable manner in the region of the front edge of the sliding lid and substantially parallel thereto. Each support lever engages, with its outer end, beneath the lateral, fixed automobile roof and bears therefrom below onto a guide track fixed to the automobile roof. This results in an additional securing of the sliding lid against lifting, which is effective also over the entire opening sliding travel of the sliding lid, if the guide track is given an appropriate length. At the same time, the support levers render unnecessary separate height adjustment devices, otherwise provided, in the region of the front sliding elements, because the height adjustment of the front region of the sliding lid, i.e. the flush alignment of the external surface of the sliding lid with the surface of the surrounding, fixed automobile roof, can be effected in simple manner with the help of the support levers.

With advantage, the support levers are each constructed as a two-armed lever having one arm shorter than the other, which lever is articulated to pivot through a limited angle on a bearing block of the front holding element or holding frame, is connected at the end of its shorter arm by a height adjustment device to the sliding lid and bears, with the end of its longer arm, against the guide track.

Advantageously, here, the bearing block is partly cut out from the front holding element or holding frame and bent downwards, the bearing block being cranked forwards at its lower end for additionally supporting the support lever.

In a preferred embodiment of the height adjustment device, this comprises a threaded sleeve with outer and inner threads, which is screwed with its outer thread into a nut fixed to the sliding lid for the purpose of height adjustment, and the inner thread of which receives a fixing screw conducted through the adjacent end of the support lever, which bears from below against the threaded sleeve. To adjust the height with the help of this device, the threaded sleeve is screwed to a greater or lesser distance into the nut and is fixed in this position by tightening up the fixing screw.

The guide track of the sliding roof can be formed on a transversely horizontal flange of a rail profile, which is clamped between mounting frame and sliding roof frame. The flange constituting the guide track is inclined from the front to the rear to give an increasing distance from the fixed automobile roof, the length of the rail profile being so designed that the support lever is situated with its outer end beneath the guide track in all positions of the sliding lid.

With advantage, in order to reduce friction during sliding, a roller is mounted at the outer end of the support lever, which roller bears against the guide track.

BRIEF DESCRIPTION OF THE DRAWINGS

For a better understanding of the invention and to show how the same may be carried into effect, reference will now be made, by way of example, to the accompanying drawings, in which:

FIG. 12 is a fragmentary plan view showing a modification of the holding frame which is formed of multiple parts or pieces.

DETAILED DESCRIPTION OF PREFERRED EMBODIMENT

Figure 1:
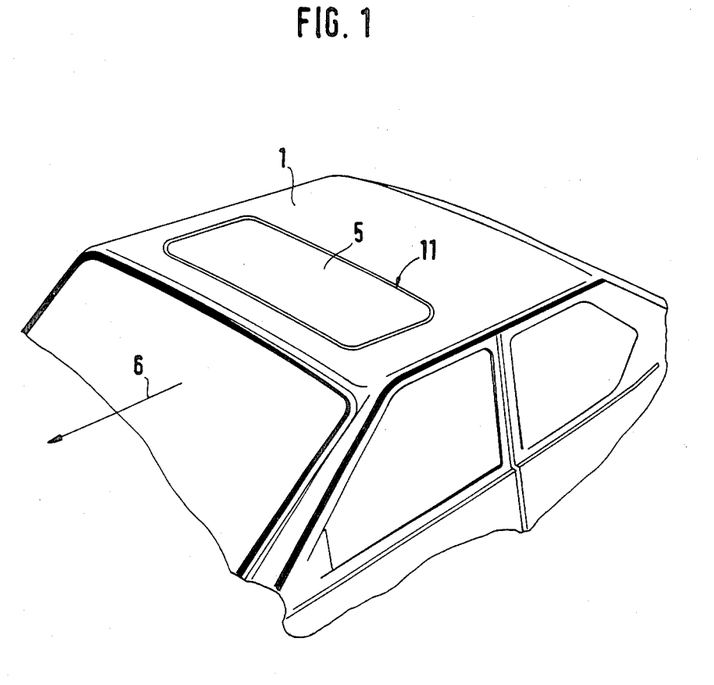
FIG. 1 is a perspective view of part of a roof of an automobile with a sliding roof with its sliding lid closed.
Figure 2:
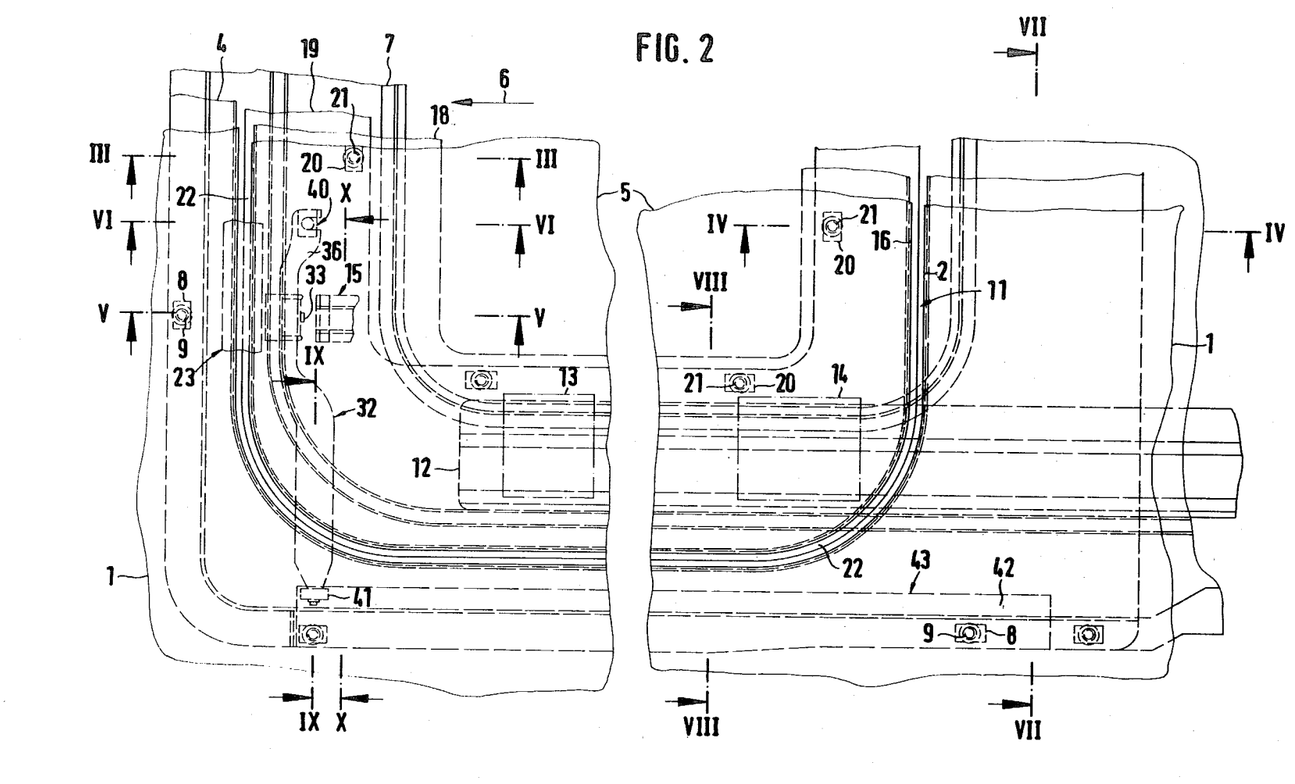
FIG. 2 is a cut-off and partly cut away plan view of the sliding roof with the sliding lid in its closed position.
Figure 3:
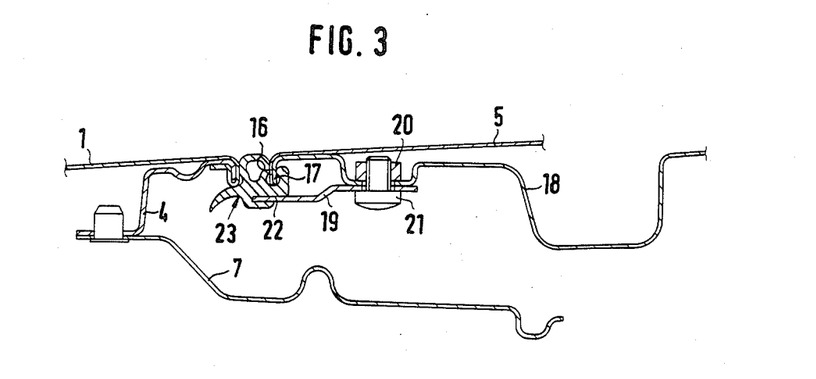
FIGS. 3 to 10 are various sections through the sliding roof taken along respective section lines, given in FIG. 2, III—III to X—X.
Figure 4:
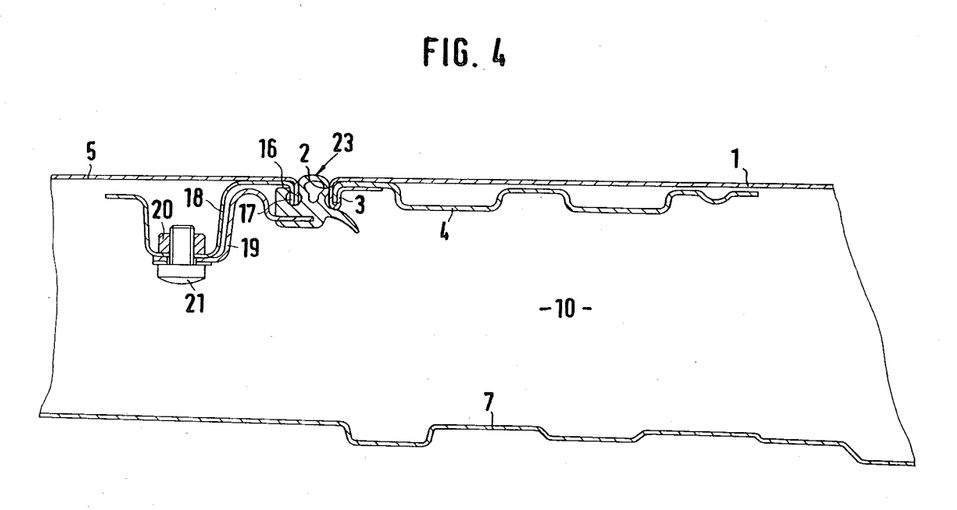

To explain the basic construction of the sliding roof, reference is first made to FIGS. 1 to 5. As can be seen therefrom, there is located in a fixed automobile roof 1 a roof opening, which is bounded all around by an edge flange 2, initially bent downwards through 90° and constituting the edges of the roof opening. The edge flange 2 continues in a channel 3, which connects a mounting flange 4, stiffening the edge of the roof opening, with the fixed automobile roof 1. The roof opening is, in the closed position of the roof shown in all FIGS. 1 to 10, closed by an appropriately shaped, rigid sliding lid 5, there being a gap 11 around the periphery of the lid 5 and between that and the roof 1. The forward travel direction of the automobile, to which the terms "front" and "rear" used here relate, is indicated in FIGS. 1 and 2 by the arrow 6.

Figure 5:
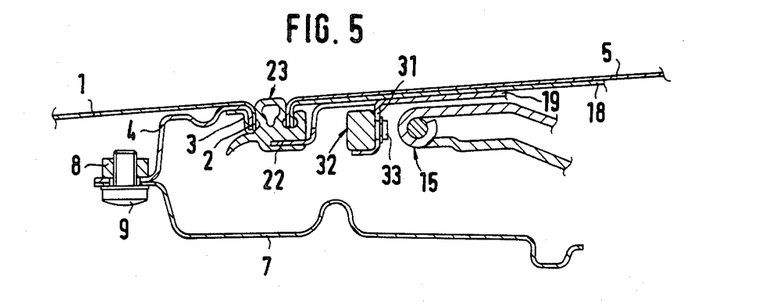
Figure 9:
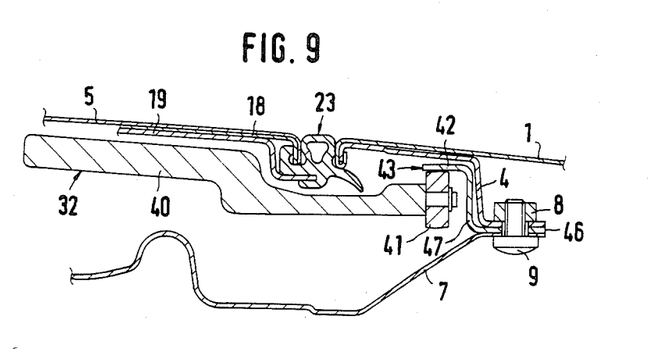

A sliding roof frame 7, carrying the functional components of the sliding roof, is screwed at front and sides from below onto the mounting frame 4, by fixing screws 9, engaging in welded-on nuts 8 (FIGS. 2, 5 and 9). The sliding roof frame 7 surrounds the roof opening at the front and sides and continues backwards below the rear, fixed automobile roof 1, and defines together with the fixed automobile roof a receiving chamber 10 for the sliding lid 5 when pushed back into the open position.

Figure 8:
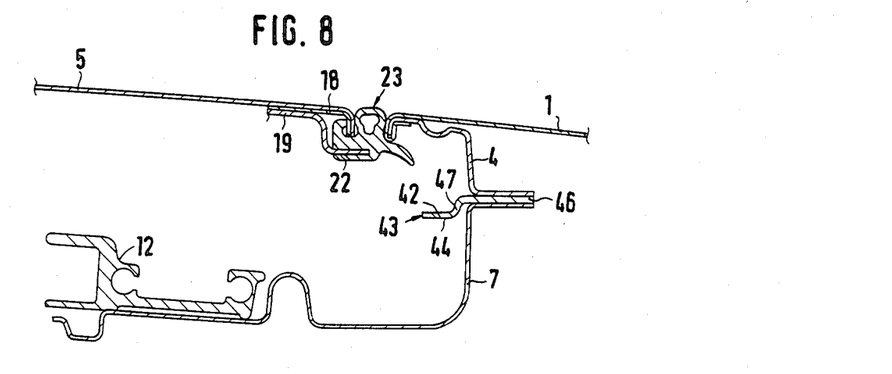

A guide rail 12 is fixed to the sliding roof frame 7 at each side of the roof opening, as illustrated for example from FIG. 2 in conjunction with FIG. 8. In FIG. 2 and the sectional views relating thereto, only the left-hand side of the roof with respect to the forward travel direction 6 is shown. The right-hand side of the roof is to opposite hand, so that only the left side will be described here. The sliding lid 5 is slidably mounted with a forward sliding element 13 and a rear sliding element 14 on the guide rail 12. The sliding elements 13 and 14 are indicated only schematically by dot-and-dash lines in FIG. 2, because their construction and also their connection to other drive functional components are unimportant for the present invention. The lower part of a hinge-like pivot bearing assembly 15 (FIG. 5) is connected to the front sliding element 13, the upper part being fixed to the sliding lid 5. The pivot bearing assembly 15 makes possible pivoting of the sliding lid 5 during lowering of its rear edge before it slides open.

Figure 11:
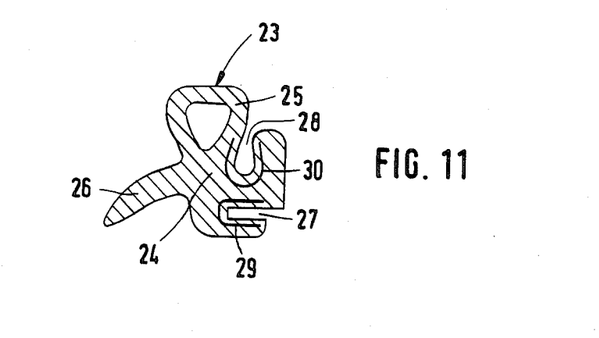
FIG. 11 is a cross-section through a sealing profile strip.

The sliding lid 5 is equipped with a peripheral, downwardly orientated edge flange 16, against which a corresponding edge flange 17 of a lid reinforcing frame 18, fixed to the sliding lid 5, bears from the inside. A holding frame 19 is releasably fixed from below to the sliding lid 5 or its lid reinforcing frame 18. In FIG. 12 the holding frame 19 is formed of multiple pieces 19a, 19b, 19c and 19d. For this purpose, welded-on nuts 20 are fixed to the lid reinforcing frame 18, into which fixing screws 21, passing through bores of the holding frame 19, are screwed. The holding frame 19 projects all around beyond the periphery of the sliding lid with an edge of uniform width, orientated horizontally as viewed in cross-section. The edge 22 is at a uniform vertical distance from the edge flanges 16, 17 pointing towards it. A sealing profile strip, referenced generally 23, which is shown in FIG. 11 to a larger scale than in the other Figures, is pushed onto the edge 22.

The sealing strip 23 has a thickened, central fixing part 24, adjoined by an upwardly orientated, elastic hollow chamber section 25, which sealingly fills the edge gap 11 when the sliding lid is closed. The fixing part is also adjoined by a lateral holding and sealing lip 26, pointing obliquely downwards, which engages beneath and bears against the fixed automobile roof 1 and its edge flange 2. A first groove 27, horizontal in cross-section, and an upwardly open, second groove 28 are also provided in the fixing part 24 of the sealing strip 23. In the region of the first and second grooves 27, 28, reinforcements 29, 30 respectively are incorporated into the fixing part 24.

Figure 10:
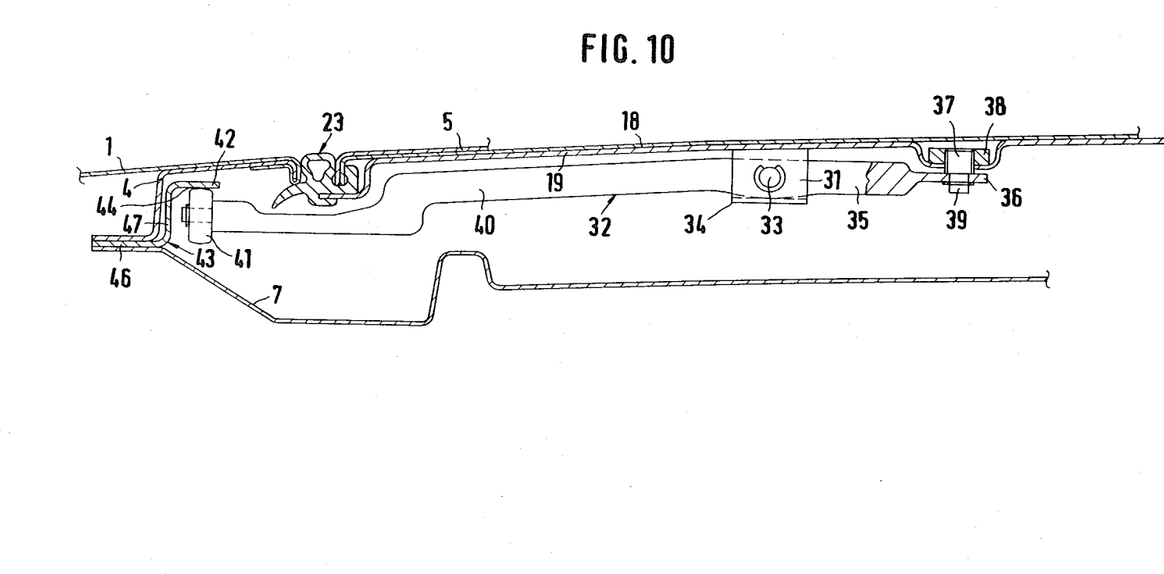

As can be seen from FIGS. 5 and 10, a vertically orientated bearing block 31 is partly cut out and bent downwards from the front frame part of the holding frame 19. The bearing block 31 is cranked forwards and supports, with this cranked flange, a support lever 32, which is pivotaly connected, fixed but with limited angular movement, to the bearing block 31, by a horizontal pivot pin 33. The support lever 32 has a concave surface 34 in the region of the forwardly orientated cranked flange of the bearing block 31, to permit pivoting of the support lever 32 about the pivot pin 33 during adjustment in height.

Figure 6:
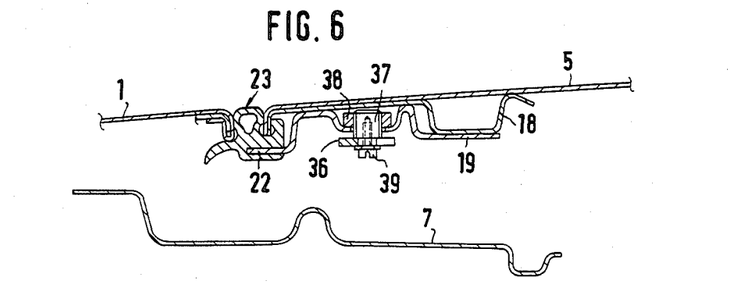
Figure 7:
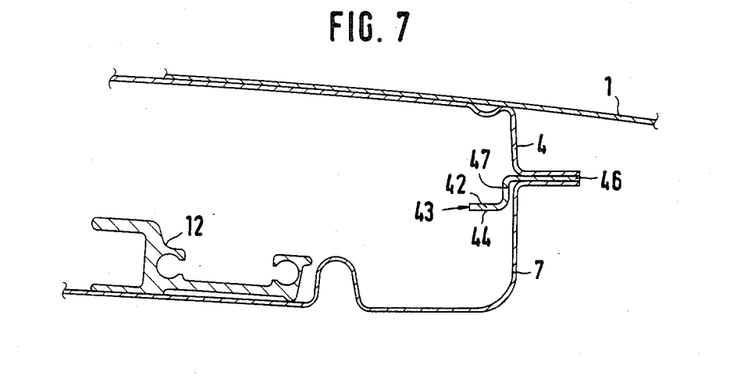

One arm 35 of the support lever 32 is shorter than the other arm 40 and is equipped at its end with a flattened zone 36, as can be seen from FIGS. 2, 6 and 10. The flattened zone 36 bears from below against a threaded sleeve 37, which is screwed by means of an external thread into a welded-on nut 38, situated in a depression of the holding frame 19. The threaded sleeve 37, equipped also with an internal thread, receives a fixing screw 39, which is conducted through a slit-shaped opening (FIG. 2) of the flattened zone 36. The welded-on nut 38 and threaded sleeve 37 are the essential parts of a height adjustment device, by means of which the pivoted position of the support lever 32 can be adjusted, in order to adjust the sliding lid 5 with its surface flush with the surface of the fixed automobile roof.

A roller 41 is mounted at the outer end of the longer arm 40 of the support lever 32, which roller bears from below against a guide track 44, provided on a flange 42 of a rail profile 43.

As FIG. 10 shows, the support lever 32 projects with the end of its longer arm 40 far beneath the fixed roof surface 1 and, by the bearing of the roller 41 against the guide track 44 mounted fixed on the roof, secures the sliding lid 1 additionally to its securing by the special measures taken in the region of the sealing strip 23, against tearing out upwards.

As can be seen from FIGS. 7 to 10, the rail profile 43 is firmly clamped by its fixing flange 46 between similarly orientated fixing flanges of the mounting frame 4 and sliding roof frame 7, by means of the welded-on nuts 8 and fixing screws 9 (FIG. 9). The rail profile extends over the entire sliding path of the sliding lid 5 and, for this purpose, commences approximately in the vicinity of the front edge of the closed sliding lid and reaches into the receiving chamber 10. In every position of the sliding lid, therefore, the roller 41 engages beneath the horizontal flange 42 of the rail profile 43.

The fixing flanges of the mounting frame 4 and the sliding roof frame 7 run substantially parallel to the roof surface. If the sliding lid 5 is to be displaced from its closed position, illustrated, into the open position, the rear edge of the lid is first lowered and the sliding lid is moved, in this inclined position, into the receiving chamber 10. Since the forward edge of the lid is guided by the support levers 32 and their rollers 41 on the rail profiles 43, the latter are so constructed in respect of a web porton 47 connecting the flange 42 with the fixing flange 46, that the distance of the horizontal flange 42 and thus of the guide track 44 from the fixed automobile roof 1 increases from front to rear, as can be seen from the section sequence of FIGS. 9, 10, 8 and 7.

In the assembling of the sliding roof, the procedure is as follows insofar as the construction elements forming part of this invention are concerned. Firstly, the sealing strip 23 and the support levers 32 are fitted to the holding frame 19. The thus completed holding frame 19 is then screwed from below to the lid reinforcing frame 18. In the approach movement, necessary for this purpose, between the sliding lid 5 and holding frame 19, the edge flanges 16, 17 enter the second groove 28 of the sealing profile 23, causing centering of the holding frame 19 with respect to the sliding lid 5. When the sliding lid 5 and holding frame 19 are screwed together, the vertical distance between the edge 22 of the holding frame 19 and the edge flanges 16, 17 is filled by the sealing strip 23, so that the sealing strip 23 is reliably secured against stripping off in both the horizontal and the vertical directions, during movements of the sliding lid 5. Furthermore, during installation of the so far described pre-assembled unit into the roof opening, the holding and sealing lip 26 comes to bear beneath the edge flange 2 of the fixed automobile roof 1, with the result that the sliding lid 5 is secured against lifting-off upwards beyond the fixed automobile roof 1. In addition, during installation, the rollers 41 meet the horizontal flanges 42 of the rail profile 43, which are fitted onto the mounting frame 4 before finally the sliding roof frame 7 is screwed from below onto the mounting frame 4.

It will be appreciated that, with the present sliding roof, assurance is provided that the sealing profile cannot be stripped off from the vertical edge flange of the sliding lid, because it is held immovably in its position by the horizontal edges of the holding elements. Since the sealing profile on the other hand engages with its sealing lip all around beneath the edge of the roof opening, the sliding lid is secured even against considerable uplift forces, to which purpose also the projection of the horizontal edges of the holding elements beyond the sliding lid periphery effectively contributes, because the edge gap is, so to speak, thereby bridged across and the sealing lip, which according to its function is both a sealing and a holding lip, is supported in a stiffening manner.

We claim:

1. In a sliding roof for an automobile having a rigid sliding lid for closing a fixed roof opening, a sliding roof frame, guide rails mounted laterally on said roof frame, front and rear sliding elements mounted on said guide rails for guiding said sliding lid, a rear edge of said sliding lid which can be lowered by pivoting with respect to said front sliding elements to slide beneath said fixed roof to the rear of the roof opening and a mounting frame onto which said sliding roof frame is releasably attached at the front and sides thereof, that improvement consisting of

- a peripheral downwardly oriented edge flange on said rigid lid;
- an intermediate sealing profile strip on said downwardly oriented edge flange for sealing a gap between the lid and the fixed roof opening;
- said intermediate profile strip having a substantially vertical seat for pushing onto the downwardly oriented edge flange of said rigid lid, a sealing lip which engages an underneath edge of the fixed roof opening, and a substantially horizontal slot in said intermediate sealing profile strip; and
- a holding frame which projects into said horizontal slot.

2. A sliding roof according to claim 1, wherein said holding frame comprises elements which are combined into a single-piece holding frame with peripheral horizontal edges, there being releasable fixing elements securing the holding frame to the sliding lid.

3. A sliding roof according to claim 1, wherein the automobile roof comprises a guide track and a support lever is fixed on each side of the lid to the front of the holding frame on a bearing block in height-adjustable manner in the vicinity of the front edge of the sliding lid and substantially parallel thereto, which lever having an outer end which engages beneath the lateral, fixed automobile roof and bears there from below onto said guide track.

4. A sliding roof according to claim 3 and comprising a height adjustment device and each said support lever being constructed as a pivoted lever having one arm which is shorter than the other, which lever is articulated to pivot through a limited angle on the bearing block of the holding frame and is connected at the end of its shorter arm by said height adjustment device to the sliding lid and bears with the end of its longer arm against the guide track.

5. A sliding roof according to claim 4, wherein said bearing block is partly cut out from the holding frame and bent downwards and is cranked forwards at its lower end for additionally supporting said support lever.

6. A sliding roof according to claim 4, wherein said height adjustment device comprises a threaded sleeve with outer and inner threads, which is screwed with its outer thread into a nut fixed to the sliding lid for the purpose of height adjustment, and the inner thread of which receives a fixing screw conducted through an adjacent end of said support lever, which bears from below against the threaded sleeve.

7. A sliding roof according to claim 3, comprising a flange of a rail profile which constitutes said guide track, said flange being clamped between said mounting frame and sliding roof frame, and being inclined from the front to the rear to give an increasing distance from the fixed automobile roof, and the length of the rail profile is such that said support lever is situated with its outer end beneath the guide track in all positions of the sliding lid.

8. A sliding roof according to claim 3, wherein a roller is mounted at the outer end of said support lever, which roller bears against the guide track.

* * * * *